United States Patent [19]

Lai

[11] 4,346,398
[45] Aug. 24, 1982

[54] AUTOMATIC CLOCK PHASE SELECTOR

[75] Inventor: Stephen Lai, Mount Prospect, Ill.

[73] Assignee: Zenith Radio Corporation, Glenview, Ill.

[21] Appl. No.: 200,673

[22] Filed: Oct. 27, 1980

[51] Int. Cl.³ .............................................. H04N 9/46
[52] U.S. Cl. .................................. 358/20; 358/21 R; 358/27; 358/178
[58] Field of Search ................. 358/20, 21 R, 27, 174, 358/176, 178

[56] References Cited

U.S. PATENT DOCUMENTS 4,263,610 4/1981 Shanley et al. ....................... 358/20

Primary Examiner—Richard Murray

[57] ABSTRACT

An automatic clock phase selector for applying input pulses of selected phases to a counter to enable an AGC gate generator and a burst-gate generator during selected time intervals is described. The automatic clock phase selector includes a generator for generating a train of true clock pulses and a train of complementary clock pulses. A pulse train selector receives these clock pulse trains and a flyback pulse. The pulse train selector is responsive to the time coincidence between a selected edge of the flyback pulse and the positive or negative portion of a true clock pulse for coupling a selected train of clock pulses to the counter. In this manner, the intervals during which the AGC gate generator and the burst-gate generator are enabled track with the occurrence of the selected edge of the flyback pulse.

6 Claims, 2 Drawing Figures

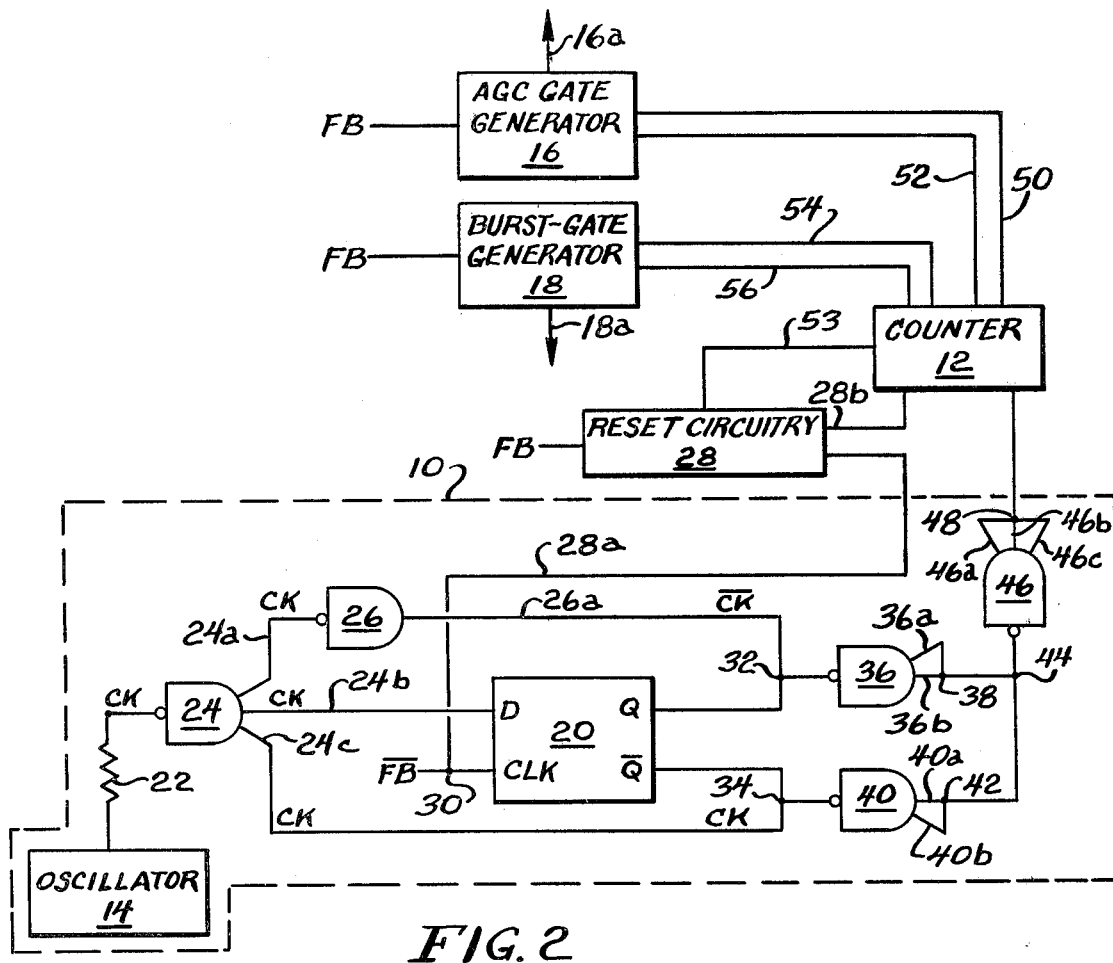
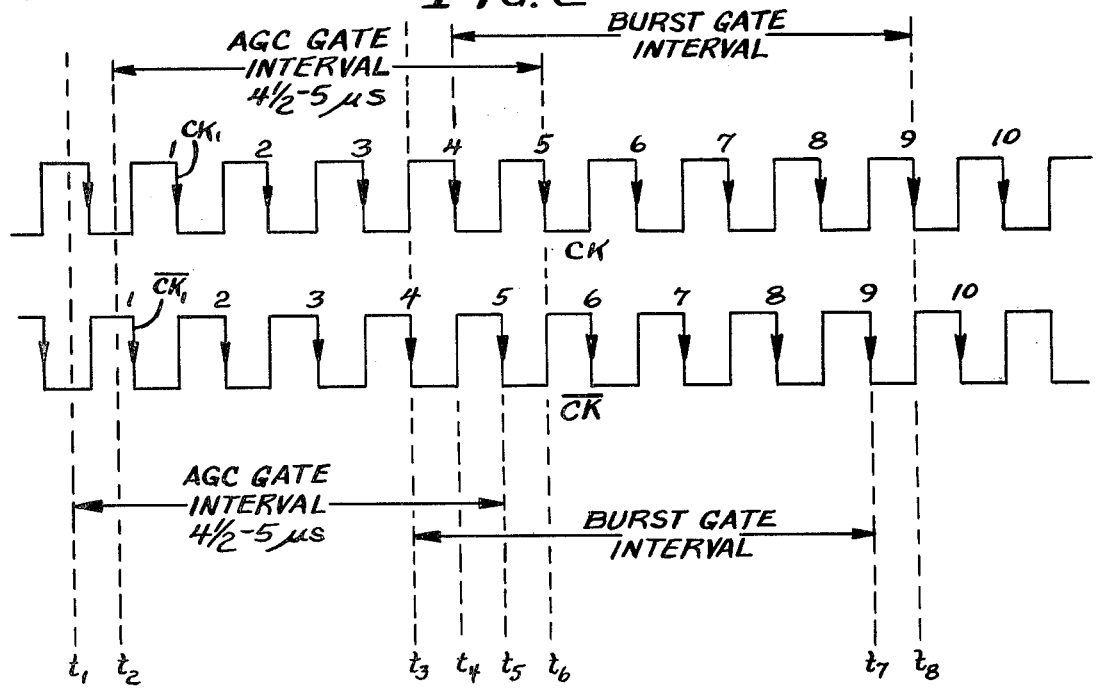

AUTOMATIC CLOCK PHASE SELECTOR

BACKGROUND OF THE INVENTION

The invention is directed generally to color television receivers and, more particularly, to an automatic clock phase selector for use in such receivers.

Modern color television receivers commonly use the leading edge of a flyback pulse as a reference for generating burst-gates and automatic gain control (AGC) gates. Traditionally, the burst-gates and the AGC gates have been generated from the flyback pulse by analog circuitry. However, analog circuitry has timing problems due to inherent temperature, voltage, and circuit parameter variations in the system. Also, analog circuitry is expensive due to the required use of external components such as resistors, capacitors, and comparators.

Digital circuitry does not have the timing problems associated with analog circuitry. In addition, the use of external components is minimized. Consequently, digital circuitry has replaced analog circuitry for many television receiver operations. However, digital circuitry has not yet been utilized for generating timing period information to enable burst-gate and AGC gates due to its own inherent drawbacks.

Integrated-injection logic ($I^2L$) and transistor-transistor logic (TTL) are two types of digital logic which have been experimented with to provide a more efficient and less expensive circuitry for generating a burst-gate and an AGC gate from a reference flyback pulse. $I^2L$ is the preferred digital logic because only two transistors are required per gate. Consequently, cost and space savings are possible with $I^2L$ technology. However, the timing variation for the burst-gate and the AGC gate with reference to a leading edge of the flyback pulse must be less than ½ microsecond. In order to attain a timing variation of less than ½ microsecond, a 2 MHz clock input is required. Unfortunately, $I^2L$ technology has a frequency response which, in its commercial applications, is limited to slightly under 2 MHz.

TTL technology easily meets the timing requirements of less than ½ microsecond variation because its frequency response may be as high as 70–80 MHz. However, TTL technology takes up too much space and is more expensive than $I^2L$ technology because at least five to six transistors are required per gate. Furthermore, TTL technology cannot be processed on the same chip with linear circuitry.

Therefore, previous attempts to replace analog circuitry with digital circuitry to generate a burst-gate and an AGC gate from a reference flyback pulse have not generally been successful. The frequency response limitations of $I^2L$ technology and the cost and incompatibility of TTL technology with linear circuitry have been the major obstacles barring the application of digital circuitry. The present invention overcomes the problems noted above with digital logic by providing a digital automatic clock phase selector for generating a burst-gate and an AGC gate from a reference flyback pulse.

OBJECTS OF THE INVENTION

It is a general object of the invention to provide more efficient and less expensive circuitry for generating a burst-gate and an AGC gate from a reference flyback pulse.

It is a more specific object of the invention to provide digital circuitry using $I^2L$ technology for generating a burst-gate and an AGC gate from a reference flyback pulse.

BRIEF DESCRIPTION OF THE DRAWING

FIG. 1 illustrates a preferred embodiment of an automatic clock phase selector according to the invention, shown in combination with a counter for enabling an AGC gate generator and a burst-gate generator over selected time intervals.

FIG. 2 illustrates complementary clock waveforms to facilitate the description of the operation of the automatic clock phase selector.

DETAILED DESCRIPTION OF THE PREFERRED EMBODIMENT

Referring to FIG. 1, the numeral 10 designates generally an automatic clock phase selector which applies clock pulses to a counter 12, both of which are preferably included in a single integrated circuit chip in a television receiver. In response to the clock inputs from the phase selector 10, the counter 12 periodically enables an automatic gain control (AGC) generator 16 and a burst-gate generator 18 for selected time intervals during each horizontal line interval. The generators 16 and 18 may be conventional reset flip-flops which, when enabled, permit detection of different portions of each line of a television video signal. For example, the AGC generator 16 may be used to detect the amplitude of the horizontal sync pulses, and the burst-gate generator 18 may be used to detect the 3.58 MHz burst signal which is disposed on the "back porch" of each horizontal sync pulse.

To ensure that the generators 16 and 18 are enabled during their proper time intervals, the phase selector 10 compares the phase of the receiver's flyback pulse to two trains of complementary clock pulses generated by the phase selector 10, as described in more detail below. The pulse train having a negative pulse portion time coincident with the leading edge of the flyback pulse is selected for application to the counter 12. In the preferred embodiment, the latter device then preferably enables the AGC gate generator 16 during the first five clock pulses and enables the burst-gate generator 18 upon the fourth clock pulse for the next five successive clock pulses. It should be noted that the time intervals for enabling the generators 16 and 18 may also be coincident, successive or separated by a time period.

The phase selector 10 and the counter 12 are reset at the end of the horizontal line of video, and the process is repeated for each succeeding horizontal line. In this manner, the generators 16 and 18 are enabled during intervals which very closely match the corresponding occurrences of the horizontal sync pulse and the color burst in a line of video.

Referring more specifically to FIG. 1, the automatic clock phase selector 10 includes a master scan oscillator 14, a flip-flop 20 and a number of associated gates which generate both a true clock signal and a complementary clock signal, and which then select the appropriate signal for counting by the counter 12. The appropriate signal is determined by the phase of the flyback pulse as discussed below.

Referring briefly to FIG. 2, the phase selector 10 generates a true clock signal CK and a complementary clock signal $\overline{CK}$. If the leading edge of the receiver's flyback pulse is time coincident with a positive portion of the CK signal, the phase selector causes the $\overline{CK}$ signal to be applied to the counter 12. On the other hand, if the leading edge of the flyback pulse is time coincident with a negative portion of the CK signal, the phase selector causes the CK signal to be applied to the counter 12. In the case where the frequency of the CK and $\overline{CK}$ pulses is about one megacycle, the counter is preferably adapted to enable the AGC gate generator for a count of 5 cycles of the selected clock signal. In this manner, a change in the phase of the flyback pulse causes the counter 12 to change the time when it starts counting pulses by only about one-half microsecond. Consequently, the times when the AGC gate generator and the burst-gate generator are initially enabled track the occurrence of the flyback pulse to within one-half microsecond.

Referring more specifically to the circuitry of FIG. 1, the master scan oscillator 14 generates a clock signal $\overline{CK}$ whose frequency is preferably selected to be equal to 1.007 megahertz. A resistor 22 couples the output of the master scan oscillator 14 to an inverter gate 24 having three output lines 24a, 24b, and 24c. As a result, a true clock (CK) signal is generated on each of the latter lines. Line 24a leads immediately to another inverter gate 26, thereby generating a complementary clock ($\overline{CK}$) signal on line 26a. Accordingly, line 24c and line 26a always carry signals complementary of each other; that is, each positive portion of the CK signal is 180 degrees out of phase with each positive portion of the $\overline{CK}$ signal, and vice versa (see FIG. 2).

The third output line 24b from inverter gate 24 delivers a CK signal to the D input terminal of a comparator in the form of flip-flop 20. Flip-flop 20, having complementary Q and $\overline{Q}$ outputs, is clocked in response to signals applied to an I²L AND gate, shown as node 30, which is coupled to the CLK input of the flip-flop. Complementary flyback ($\overline{FB}$) pulses are applied to the AND gate node 30 once for each line of video. In addition, the node 30 receives a reset signal from reset circuitry 28 via the line 28a. The latter circuitry is adapted to sense the state of the counter 12 and to provide a high level reset signal to the counter via line 28b and to the node 30 via line 28a. Thus, whenever the reset signal on line 28a is high, the $\overline{FB}$ pulse is coupled via the AND gate node 30 to the flip-flop 20 for clocking the latter device. When so clocked, the Q and $\overline{Q}$ outputs of the flip-flop assume complementary states which are determined by the state of the CK signal received at the flip-flop's D input terminal.

The state of the Q output terminal is determined during a positive-to-negative transition of the $\overline{FB}$ pulse input to the CLK terminal. Whatever state is registered at the D terminal during the postive-to-negative transition at the CLK terminal, the Q output terminal will register the same state or condition for the next cycle. For example, if the CK input at terminal D is high when the CLK input is changing from a high to a low state, Q will go high and maintain this condition at least until the next positive-to-negative transition at the CLK terminal. Conversely, if the CK input at terminal D is low when a positive-to-negative transition occurs at the CLK terminal, then Q will go low and maintain this condition at least until the next positive-to-negative transition at the CLK terminal.

The output signals from the flip-flop 20 and the complementary clock signals are applied to a selector or switch arranged from a number of associated gates. The signal from the Q output terminal of flip-flop 20 and the $\overline{CK}$ signal on line 26a are delivered to an AND gate node 32 while the signal on the $\overline{Q}$ output terminal and the CK signal on line 24c are simultaneously delivered to an AND gate node 34. The output of AND gate node 32 is connected to an inverter gate 36 having two output lines 36a and 36b which connect to another AND gate node 38. The lines 36a and 36b are connected together for doubling the current sinking and driving capability of the inverter gate 36 so that the AND gate represented by node 38 has a higher injector current. In a similar manner, the output of AND gate node 34 is connected to an inverter gate 40 having two output lines 40a and 40b which connect to another AND gate node 42. The outputs of AND gate nodes 38 and 42 are then coupled to a further AND gate node 44.

Assuming now that the CK input to the flip-flop's D input is high when the $\overline{FB}$ clock input to the flip-flop undergoes a positive-to-negative transition, as at time $t_1$ in FIG. 2, the Q and $\overline{Q}$ outputs of the flip-flop are driven high and low, respectively. Consequently, the AND gate node 32 applies the $\overline{CK}$ signal on line 26a to inverter 36 to develop CK signals at output lines 36a and 36b. Accordingly, the AND gate node 38 applies a CK signal to the node 44. Meanwhile, the signal on the $\overline{Q}$ output terminal is low, thereby inhibiting the CK signal on line 24c at AND gate node 34 and providing a low input to inverter 40. As a result, a high state is generated at output lines 40a and 40b, causing a high output from AND gate node 42. The high from AND gate node 42 and the CK signal from AND gate node 38 are then delivered to AND gate node 44, whereby the CK signal is enabled as the output from node 44.

The AND gate node 44 is connected to an inverter gate 46 having three output lines 46a, 46b, and 46c joined at the input to an AND gate node 48. The latter node is conected to an input of the counter 12. With this arrangement, the output from the AND gate node 48 will either be a CK signal or a $\overline{CK}$ signal, depending upon the state of the signal on the Q output terminal. As mentioned previously, if the signal on the Q output terminal is high, then a CK signal is enabled at the AND gate 44 for delivery to the inverter gate 46. Accordingly, the inverter gate 46 generates a $\overline{CK}$ signal to its three output lines 46a, 46b, and 46c, and a $\overline{CK}$ signal is generated at the AND gate node 48 to clock the counter 12.

Assuming now that the positive-to-negative transition of the $\overline{FB}$ clock input to the flip-flop 20 occurs when the CK input to flip-flop's D input is low, as at time $t_2$ in FIG. 2, the Q and $\overline{Q}$ outputs of the flip-flop are driven low and high, respectively. As a result, the signal on the Q output terminal is low, and AND gate node 32 inhibits the $\overline{CK}$ signal on line 26a. Consequently, a low state is generated as the output of AND gate node 32 and delivered to inverter gate 36, thereby generating a high at output lines 36a and 36b and a high at the output of AND gate node 38. At the same time, the signal on the $\overline{Q}$ output terminal is high, thereby enabling the CK signal on line 24c at AND gate node 34 to be delivered to inverter 40. This results in a $\overline{CK}$ signal being generated at output lines 40a and 40b and from AND gate node 42. The high from AND gate node 38 and the $\overline{CK}$ signal from AND gate node 42 are then delivered to the AND gate node 44. As a result, the $\overline{CK}$ signal is enabled as the output from the AND gate node 44. Accordingly, the inverter gate node 46 generates a CK signal to its three output lines 46a, 46b, and 46c, and a CK signal is generated at the AND gate node 48 for application to the counter 12. Thus, when the Q output of the flip-flop 20 is high, a $\overline{CK}$ signal is outputted from the AND gate node 48 for application to the counter 12. Conversely, when the Q output of flip-flop 20 is low, a CK signal is outputted from the same node for application to the counter 12.

At this juncture it should be pointed out that the counter's output lead 50 is driven high when the counter is reset by the reset circuitry 28 as described hereinafter. When the next FB pulse occurs after resetting, that pulse is received by the AGC generator 16. Each FB pulse lasts for approximately 12 microseconds or counts in this embodiment. The simultaneous occurrence of the high level signal on the output lead 50 and the FB pulse as input to the AGC gate generator 16 produces a high level signal at output terminal 16a. The signal at output terminal 16a remains high until the counter 12 has counted five of the CK or $\overline{CK}$ pulses received from the node 48. The counter 12 then drives its output lead 52 high to reset the AGC gate generator 16, thereby producing a low level signal at output terminal 16a.

The burst gate generator 18 produces a high level signal at its output terminal 18a upon the simultaneous occurrence of a high level signal on the output lead 54 and the FB pulse. During the first twelve counts of the counter 12, the FB pulse is being applied to the burst gate generator 18. However, the output lead 54 maintains a low level signal thereon until the counter 12 registers a fourth count whereupon a high level signal is produced and applied to the burst-gate generator for one count. The combined inputs from the FB pulse and the high level signal on lead 54 enable the burst-gate generator to produce a high level signal at output terminal 18a. The signal at the output terminal remains high until the counter 12 has counted nine of the CK or $\overline{CK}$ pulses received from the node 48. When the counter 12 registers the ninth pulse, then it generates a high level signal on its output lead 56 for one count. This high level signal is applied to the burst-gate generator 18 to reset the signal on output terminal 18a back to a low level. Thereafter, the output terminals 16a and 18a maintain low level signals until the counter 12 has been reset and the next $\overline{FB}$ and FB pulses occur on the next video line.

The counter 12 also applies a signal to the reset circuitry 28 during the count via line 58. The signal on line 58 remains at a low level until the counter 12 registers the fifty-fourth count at which time a high level signal is generated on line 58 for one count and applied to the reset circuitry 28. As a result, a high level signal is generated on lines 28a and 28b. The high level signal on 28b is applied to the input terminal R of the counter 12 to reset the counter for the next video line.

When the leading edge of the FB pulse occurs on the next video line, the high level signal on line 28a enables the positive-to-negative transition of the $\overline{FB}$ pulse at the AND gate node 30 to be applied to the CLK terminal of flip-flop 20 and the appropriate train of pulses is selected. Almost simultaneously, the FB pulse being applied to the reset circuitry 28 causes the reset circuitry to generate low level signals on lines 28a and 28b. As a result, the low level signal on line 28a inhibits the AND gate node 30 and the low level signal on line 28b enables the counter 12 to initiate counting.

Referring to FIGS. 1 and 2, if at the beginning of a video line the leading edge of the FB pulse occurs during a positive portion of the CK signal, at $t_1$, for example, then the phase selector 10 selects the $\overline{CK}$ signal. As mentioned previously, the leading edge of the FB pulse is also applied to the reset circuitry, thereby resetting counter 12 to 0 and initiating an upward count in the counter 12. At the count 0, the counter 12 generates a high level signal on line 50 for application to the AGC gate generator 16. Accordingly, the AGC gate generator 16 produces a high level signal at its output terminal 16a to initiate ACG gating. The next trailing edge of the $\overline{CK}$ signal, as shown by $\overline{CK}_1$, registers a count of 1 in the counter 12. Thereafter, the counter continues to count the trailing edges of the $\overline{CK}$ signal.

When the counter 12 reaches a count of 4 at time $t_3$, the signal on the counter's output lead 54 is driven to a high level for one count, thereby setting the burst-gate generator 18 to produce a high level signal at output terminal 18a. When the counter 12 registers the count of 5 at time $t_5$, the signal on the counter's output lead 52 is driven to a high level for one count, thereby resetting the AGC gate generator 16 so that a low level signal is generated at output terminal 16a. Shortly thereafter, when the counter 12 registers the count of 9 at time $t_7$, the signal on the counter's output lead 56 is driven to a high level for one count thereby resetting the burst-gate generator so that a low level signal is generated at output terminal 18a.

Conversely, if the leading edge of the FB pulse occurs during the negative portion of the CK signal, as at time $t_2$, the CK signal is selected by the phase selector 10 and applied to the counter 12. Immediately, the counter 12 generates a high level signal for one count on the output lead 50 which sets the AGC gate generator 16 to produce a high level signal at its output terminal 16a. The counter 12 registers a count of 1 on the next trailing edge of the CK signal, as shown by $CK_1$, following time $t_2$ and continues an upward count.

When the counter 12 registers a count of 4 to represent the fourth trailing edge of the CK signal at time $t_4$, the signal on the counter's output lead 54 is driven to a high level for one count, thereby setting the burst-gate generator 18 to produce a high level signal at output terminal 18a. Upon registering a count of 5 at time $t_6$, the counter generates a high level signal on its output lead 52 which is applied to the AGC gate generator 16. Accordingly, the AGC gate generator is reset to produce a low level signal at its output terminal 16a. When the counter 12 registers a count of 9 at time $t_8$, the signal on its output lead 56 is driven to a high level and applied to burst-gate generator 18. As a result, burst-gate generator 18 is reset to produce a low level signal at output terminal 18a.

Because each cycle of the CK and $\overline{CK}$ signals are approximately one microsecond long, a change in the phase of the flyback pulse which causes a switch in the selection from CK to $\overline{CK}$, or vice versa, results in only a one-half microsecond change in the time required for the counter to count five cycles of the selected signal. Hence, the gate generators 16 and 18 are enabled for durations which are closely controlled.

In the above description, specific details of an embodiment of the invention have been provided for a thorough understanding of the invention concepts. It will be understood by those skilled in the art that many of these details may be varied without departing from the invention. For example, the time intervals during which the generators 16 and 18 are enabled do not necessarily have to overlap. Instead, these time intervals may be successive or back-to-back. Furthermore, the time intervals during which the generators are enabled may be separated by an additional time interval. Accordingly, it is intended that all such variations be included within the spirit and scope of the invention as defined by the appended claims.

What is claimed is:

1. In a television receiver which develops a flyback pulse and which has an AGC gate generator, a burst-gate generator, and a counter for enabling the AGC gate generator and the burst-gate generator for given time intervals during each horizontal video line in response to input pulses applied to the counter, an automatic clock phase selector for applying input pulses of selected phases to the counter to enable the generators during selected time intervals comprising:

means for generating a train of true clock pulses having positive portions and negative portions, and for generating a train of complementary clock pulses having positive portions and negative portions; and selector means receiving said clock pulses and the flyback pulse and being responsive to time coincidence between a selected edge of the flyback pulse and the positive portion of a true clock pulse for coupling a selected one of the trains of clock pulses to the counter, and being responsive to time coincidence between said edge of the flyback pulse and the negative portion of the true clock pulse for coupling the other train of clock pulses to the counter so that the intervals during which the AGC gate generator and the burst-gate generator are enabled track with the occurrence of said edge of the flyback pulse.

2. A clock phase selector as set forth in claim 1 wherein said clock generating means is adapted to generate clock pulses having a frequency of approximately one megahertz so that changes in the phase of the flyback pulse result in enabling intervals for the AGC gate generator and the burst-gate generator which track the occurrence of the flyback pulse to within approximately one-half microsecond.

3. The automatic clock phase selector of claim 1 wherein said selector means includes:

comparator means receiving the train of true clock pulses and the flyback pulse for generating a binary control signal having a first state when leading edge of the flyback pulse is time coincident with a positive portion of the train of true clock pulses and having a second state when the leading edge of the flyback pulse is time coincident with a negative portion of the train of true clock pulses; and switching means responsive to said comparator means for selecting the train of complementary clock pulses as input to the counter when said binary control signal is in a first state and for selecting the train of true clock pulses when said binary control signal is in a second state.

4. The automatic clock phase selector of claim 3 wherein said comparator means includes:

a flip-flop having a first input terminal for receiving the train of true clock pulses, a second input terminal for receiving a flyback pulse, and first and second output terminals for outputting a pair of complementary signals constituting said binary control signal.

5. The automatic clock phase selector of claim 3 wherein said switching means includes digital gates receiving said trains of clock pulses and said binary control signal for applying the train of complementary clock pulses to the counter in response to the binary control signal being in the first state and for applying the train of true clock pulses to the counter in response to the binary control signal being in said second state.

6. In a television receiver which develops a flyback pulse and which has an AGC gate generator, a burst-gate generator, and a counter for enabling the AGC gate generator and the burst-gate generator for given time intervals during each horizontal video line in response to input pulses applied to the counter, an automatic clock phase selector for applying input pulses of selected phases to the counter to enable the generators during selected time intervals comprising:

means for generating a train of true clock pulses having positive portions and negative portions, and for generating a train of complementary clock pulses having positive portions and negative portions, both of said trains of clock pulses being generated at a frequency of approximately one megahertz;

a flip-flop receiving the train of true clock pulses and the flyback pulse and responsive to time coincidence between the flyback pulse and the positive portion of a true clock pulse for generating a first high level binary output signal and a second low level binary control signal, and responsive to time coincidence between the flyback pulse and the negative portion of a true clock pulse for switching the first output signal to a low state and the second output signal to a high state;

digital gate means receiving the trains of clock pulses from said generating means and the binary control signals from said comparator means for coupling the train of complementary clock pulses to the counter in response to the first output signal being at a high level and the second output signal being at a low level, and for coupling the train of true clock pulses to the counter in response to the first output signal being at a low level and the second output signal being at a high level.

* * * * *